J. W. ANDERSON.
Thill-Coupling.
No. 196,177.                Patented Oct. 16, 1877.
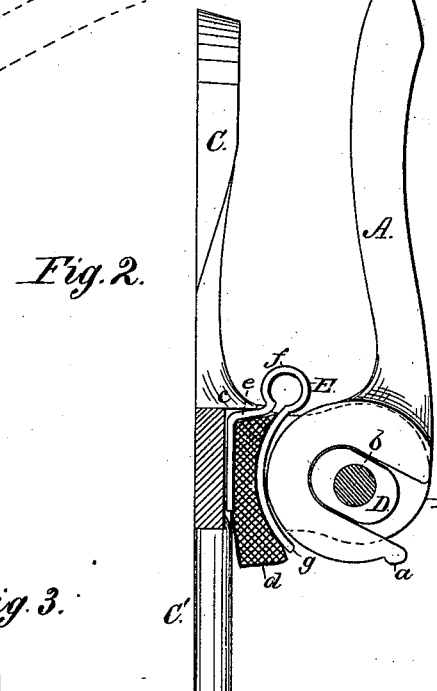
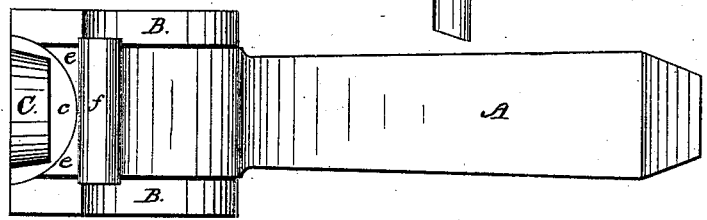

UNITED STATES PATENT OFFICE.

JOHN W. ANDERSON, OF NEW YORK, N. Y.

IMPROVEMENT IN THILL-COUPLINGS.

Specification forming part of Letters Patent No. 196,177, dated October 16, 1877; application filed August 18, 1877.

*To all whom it may concern:*

Be it known that I, JOHN W. ANDERSON, of the city, county, and State of New York, have invented a new and Improved Thill-Coupling; and I do hereby declare that the following is a full, clear, and exact description of the same, reference being had to the accompanying drawing, forming part of this specification, in which—

Figure 1 is a side view of the coupling, with the position for applying the thill-iron indicated in dotted lines. Fig. 2 is a sectional view of the same, with the coupling in the position it occupies when the horse is attached. Fig. 3 is a plan view.

My invention relates to certain improvements in thill-couplings of that class in which the thill-iron is made in the form of a hook, and is fastened to the pivot-pin by being hooked over the same in a certain position, and afterward turned to the working position, in which the parts cannot be separated.

The improvements consist, mainly, in constructing the hooked or open slotted thill-iron with a notch upon its rear side, and combining the same with a rubber block, and a detent held between the ears of the clip, whereby the devices are prevented from being accidentally detached if the position of the thill-iron should be changed from the falling of the horse, or from other causes.

The improvements also consist in forming the clip with a lip just above and outside of the edge of the ears, for the purpose of retaining and holding the rubber block and locking-detent in place.

In the drawing, A represents the thill-iron, the shank of which is narrowed near the eye for greater symmetry, but is left unfinished, as usual, to permit it to be fashioned to the style of shaft or fancy of the carriage-maker. In forming the iron by drop-forging in dies, the eye portion is left solid, and an open slot is afterward milled out to form the hook, while upon the rear face of the hook thus formed is cut a notch, *a*, whose function will be hereinafter described.

B B are ears formed in one and the same piece with the clip-blank C C′, and connected by an eccentric pivot-pin, *b*, which latter is fixedly riveted in said ears by square-riveting, to prevent turning. Upon the pivot-pin, and between the ears, is arranged a loosely-revolving tumbler or cam, D, which is made oblong in transverse dimension, and conforms in thickness to the width of the slot in the hook. In forming the ears and the clip, they are made, by drop-forging, from a single piece of metal or blank, in which the ears and the clip portion are originally in the same plane, the ears being forged with solid corners, and afterward, by a subsequent operation, bent up to the right-angular position which they occupy when finished. In forging the same, the dies (the right to which I reserve for a subsequent application) are made with a depression just above the ears, which forms a lip, *c*, whose function is to retain the rubber block and detent. The location of the lip *c* outside of the ears, it will be seen, secures in this connection an important advantage, as it enables me to form the lip simultaneously with the forging of the other parts, and, by being located outside of the ears, permits the latter to be bent up by the subsequent steps of cold-bending which the lip would not permit if it were located between the ears. Said lip is, however, for the sake of neatness of construction, located close to the ears, so as to be adjacent to the same when bent up, and is preferably curved, as shown in Fig. 3, to make neater corners. This construction of clip, which enables me to form the same by drop-forging, insures a much more expeditious and economical manufacture, and enables me to produce a superior article at a cheaper rate.

In forming the clip and ears, the clip, like the thill-iron, is left in an unfinished state in the form of a blank, C, which is afterward bent around the carriage-axle, and its end, with the end C′, milled down and screw-threaded to receive the nuts that secure the bottom plate, which holds the clip to the axle.

The devices for preventing rattle and holding the thill-iron in place consist of a rubber block or cushion, *d*, partly encompassed and held by a spring-detent, E, which is of the same width as the space between the ears. This detent is formed with a shoulder, *e*, that fits up against, and is held from rising out of its place by, the lip *c*. It also has a tubular springing projection, *f*, above the ears, and from this point is extended downwardly in front of the rubber to form a metal face-plate for the same, and terminates below in a detent or pawl edge, g.

In securing the thills to the clip, the thill-iron is applied in the position shown in dotted lines in Fig. 1, which is the position which the shafts occupy when on the ground or not in use. The thills are then turned up to their working position, as shown in Fig. 2, which causes the notch a in the thill-irons to pass over the pawl-edge g, which prevents the thills from becoming accidentally detached when lowered again. This same movement causes the tumbler or cam D to turn with the thill-iron upon its pivot-bolt, which tumbler projects the rear side of the hook against the spring-detent E, and compresses the rubber block behind it, to tighten the connection and prevent rattling.

In detaching the devices, the lower edge of the detent is removed from the notch in the thill-iron by turning the thills to their lower position and pressing upon the tubular portion of the detent above the ears.

In defining the limits of my invention, I do not claim, broadly, the hooked thill-iron; nor do I claim the tumbler, except when combined with other parts and located eccentrically, as shown and described; and as to the detent, I do not limit myself to the particular form shown, as I may employ a pivoted detent-block, to operate in connection with the notch on the thill-iron and the block of rubber to produce the same result. In using the locking feature of my invention, I may also dispense with the tumbler or cam, and employ only a plain pivot-bolt.

Having thus described my invention, what I claim as new is—

1. The hooked or open slotted thill-iron, having a notch or lip upon its rear face, combined with the clip having ears and a stationary pivot-pin, and with a rubber block and a detent whose lower end will engage said lip and prevent accidental detachment of the thill-iron, substantially as described, and for the purpose set forth.

2. The combination, with ears B B, of the eccentrically-located pivot-pin, the oblong tumbler or cam embracing the latter, the hook-shaped thill-iron provided with a notch or lip, and the detent and rubber block, as shown and described.

3. The clip C C', formed in one piece with the ears, and having a lip, c, located just above the edge of the ears, in combination with the detent, for the purpose described.

The above specification of my invention signed by me this 10th day of August, 1877.

JOHN W. ANDERSON.

Witnesses:
EDWD. W. BYRN,
SOLON C. KEMON.